United States Patent
Hori (10) Patent No.: US 7,028,667 B2
(45) Date of Patent: Apr. 18, 2006

(54) FUEL SUPPLY APPARATUS FOR INTERNAL COMBUSTION ENGINE

(75) Inventor: Yasuyoshi Hori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/919,356

(22) Filed: Aug. 17, 2004

(65) Prior Publication Data
US 2005/0229896 A1    Oct. 20, 2005

(30) Foreign Application Priority Data
Apr. 16, 2004    (JP) .............................. 2004-121532

(51) Int. Cl.
*F02M 37/04* (2006.01)
(52) U.S. Cl. ...................... 123/446; 123/494
(58) Field of Classification Search ................ 123/446, 123/458, 500–501, 494
See application file for complete search history.

(56) References Cited
U.S. PATENT DOCUMENTS

| | | | |
|---|---|---|---|
| 6,314,945 B1 * | 11/2001 | Sugiyama et al. | 123/506 |
| 6,526,947 B1 * | 3/2003 | Shimada et al. | 123/495 |
| 6,820,596 B1 * | 11/2004 | Namari et al. | 123/501 |
| 2001/0006061 A1 * | 7/2001 | Shimada et al. | 123/495 |
| 2004/0011335 A1 * | 1/2004 | Namari et al. | 123/501 |

FOREIGN PATENT DOCUMENTS
JP    4-334740 A    11/1992

* cited by examiner

Primary Examiner—Thomas Moulis
(74) Attorney, Agent, or Firm—Sughrue Mion, PLLC (57) ABSTRACT

A fuel supply apparatus for an internal combustion engine includes a rotation position detection unit for outputting a rotation position signal of the internal combustion engine, a control unit for controlling a electromagnetic valve by the rotation position signal so that the discharge amount corresponds to an operation state, and an error estimation means for estimating the attachment error of a high pressure fuel pump and a pump driving cam on the basis of a fuel pressure change position where the fuel pressure in a delivery pipe is changed by a discharge start of the high pressure fuel pump and a rotation position of the internal combustion engine, in which the control unit controls the control signal to the electromagnetic valve according to the attachment error estimated by the error estimation means.

11 Claims, 10 Drawing Sheets

FUEL SUPPLY APPARATUS FOR INTERNAL COMBUSTION ENGINE

BACKGROUND OF THE INVENTION

1. Field of the Invention

The present invention relates to a fuel supply apparatus for controlling a fuel supply amount of an in-cylinder injection type internal combustion engine in which pressurized fuel is directly injected into a combustion chamber.

2. Description of the Related Art

A fuel supply apparatus used for an in-cylinder injection type internal combustion engine for a vehicle includes plural fuel injection valves for directly injecting fuel into respective cylinders of the internal combustion engine, a delivery pipe for supplying the fuel to the fuel injection valves, a high pressure fuel pump for supplying the pressurized fuel to the delivery pipe, a low pressure fuel pump for supplying the fuel to the high pressure fuel pump from a fuel tank, a control unit for controlling an injection timing of the fuel, an injection amount, and a discharge amount of the high pressure fuel pump, and the like. The high pressure fuel pump includes a cylinder, a piston which is driven by a rotating shaft of the internal combustion engine, for example, a pump driving cam provided at a cam shaft and reciprocates in the cylinder to suck the fuel into a pressure chamber at a suction stroke and pressure-sends the fuel in the pressure chamber to the delivery pipe at a discharge stroke, an electromagnetic valve which controls a fuel discharge amount from the pressure chamber and controls a fuel pressure in the delivery pipe by releasing the pressurized fuel in the pressure chamber to the low pressure side at a predetermined timing, and the like.

Since it is necessary to ON-OFF control the electromagnetic valve at a predetermined timing in accordance with a lift of the pump driving cam, the ON-OFF timing is controlled by using a rotation position signal indicating the position of the pump driving cam. The control of the ON-OFF position of the electromagnetic valve is required to be performed on the basis of a rotation position of a crank shaft of the internal combustion engine, that is, a crank angle. However, when an attachment position of the high pressure fuel pump has an error, or the pump driving cam is provided at a shaft different from the crank shaft, a deviation occurs in the cam lift relative to the crank angle and has a bad influence on the performance of the internal combustion engine. For the purpose of preventing the bad influence, various proposals for correcting the position deviation have been made.

A technique disclosed in patent document 1 (Japanese Patent No. 2836282 (pages 2 to 4, FIGS. 1, 2 and 5)) relates to correction of the attachment position. According to the technique disclosed in this document, in a fuel injection apparatus for a diesel engine having a common rail (delivery pipe), in order to prevent a bad influence on the performance of an internal combustion engine by correcting a deviation of a cam lift relative to a crank angle at time of trouble of a common rail pressure sensor, an engine rotation sensor for detecting a rotation angle of a crank shaft is provided at the crank shaft of the internal combustion engine, an attachment position error angle of a fuel pump is detected by a comparison between a specific crank position by the engine rotation sensor and a rotation position by a cylinder identification sensor provided at a cam shaft for driving the fuel pump, and power application to a spill electromagnetic valve is controlled in consideration of the attachment position error angle, so that an attachment error is corrected and high pressure fuel is pressure-sent to the common rail.

In the patent document 1, the correction of the attachment error is performed as described above. However, in this related art, since the phase difference between the signal of the cylinder identification sensor provided at the cam shaft for driving the fuel pump and the specific position signal of the engine rotation sensor provided at the crank shaft is merely detected, an attachment error of the fuel pump relative to a pump driving cam provided at the cam shaft can not be corrected, and the error in the discharge fuel amount relative to the delivery pipe can not be completely corrected. When the error occurs in the discharge fuel amount, the fuel pressure in the delivery pipe is not controlled to a predetermined pressure. Thus, an error occurs also in the amount of fuel injected from a fuel injection valve, and a predetermined air-fuel ratio is not obtained, and as a result, the combustion of the internal combustion engine is deteriorated and the performance (traveling performance of a vehicle) and exhaust gas are deteriorated.

SUMMARY OF THE INVENTION

The invention has been made to solve the problem as stated above, and an object thereof is to provide a fuel supply apparatus for an internal combustion engine in which an attachment error of a fuel pump and a pump driving cam relative to a rotation signal is estimated so that an electromagnetic valve is controlled with high accuracy and an error in fuel discharge amount can be reduced.

A fuel supply apparatus for an internal combustion engine of the invention includes a delivery pipe for supplying a pressurized fuel to a fuel injection valve for performing fuel supply to each cylinder of the internal combustion engine, a high pressure fuel pump actuated by a pump driving cam driven by the internal combustion engine and for discharging the pressurized fuel to the delivery pipe, an electromagnetic valve for adjusting a fuel discharge amount from the high pressure fuel pump, a rotation position detection unit for outputting a rotation position signal of the internal combustion engine, a control unit for controlling the electromagnetic valve by a control signal corresponding to the rotation position signal so that the fuel discharge amount corresponds to an operation state of the internal combustion engine, and for controlling a fuel pressure in the delivery pipe, and a cam position error estimation means for estimating an attachment error of the high pressure fuel pump and a pump driving cam on the basis of a fuel pressure change position where the fuel pressure in the delivery pipe is changed by a start of fuel discharge from the high pressure fuel pump and a rotation position of the internal combustion engine obtained by the rotation position detection unit, in which the control unit controls the control signal to the electromagnetic valve according to the attachment error estimated by the cam position error estimation means.

According to the fuel supply apparatus for the internal combustion engine of the invention constructed as stated above, the control signal to the electromagnetic valve is corrected in accordance with the attachment error of the pump driving cam and the high pressure fuel pump relative to the rotation position signal, the angle of the attachment error is corrected, and the driving of the electromagnetic valve is performed. Accordingly, the accuracy of the fuel discharge amount is improved, it becomes possible to control the fuel pressure in the delivery pipe to a predetermined pressure with high accuracy so that an optimum air-fuel ratio can be obtained, excellent combustion is obtained, and the deterioration of traveling performance of a vehicle and exhaust gas can be prevented.

DETAILED DESCRIPTION OF THE INVENTION

Figure 1:
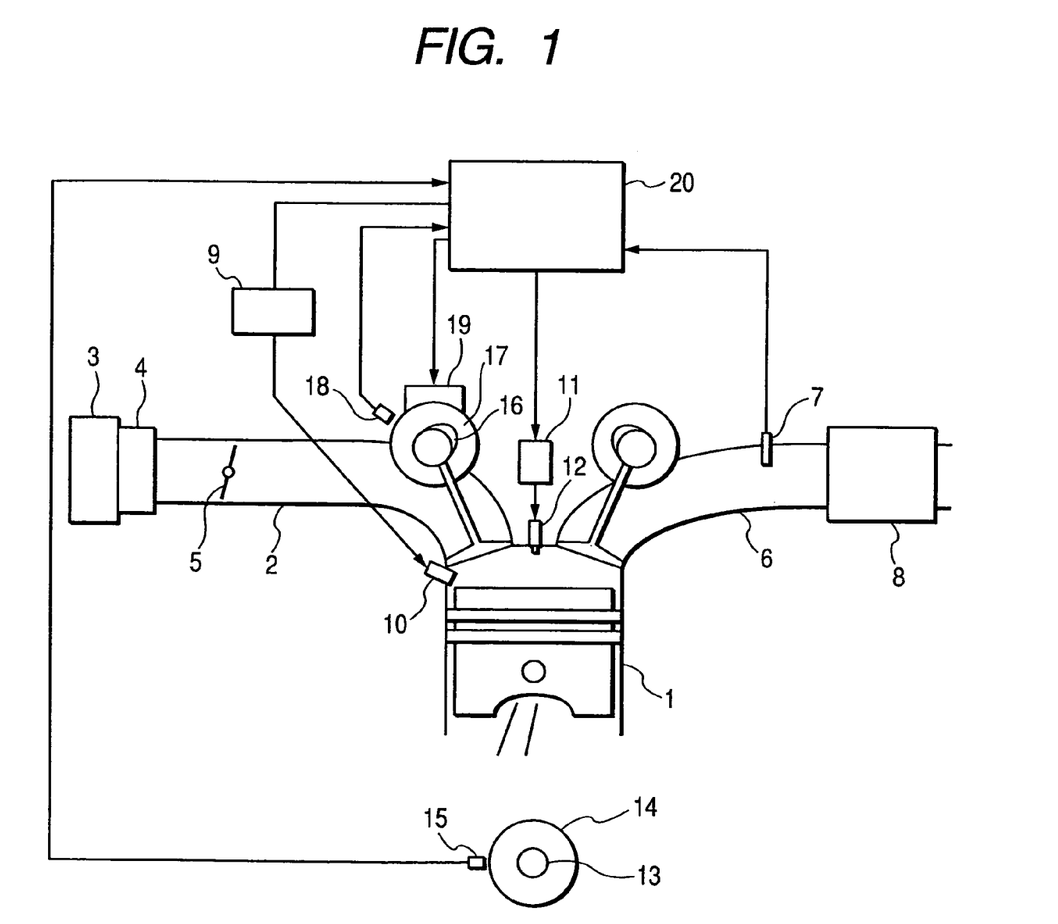
FIG. 1 is a schematic structural view for explaining a control system of a fuel supply apparatus for an internal combustion engine according to embodiment 1 of the invention.
Figure 2:
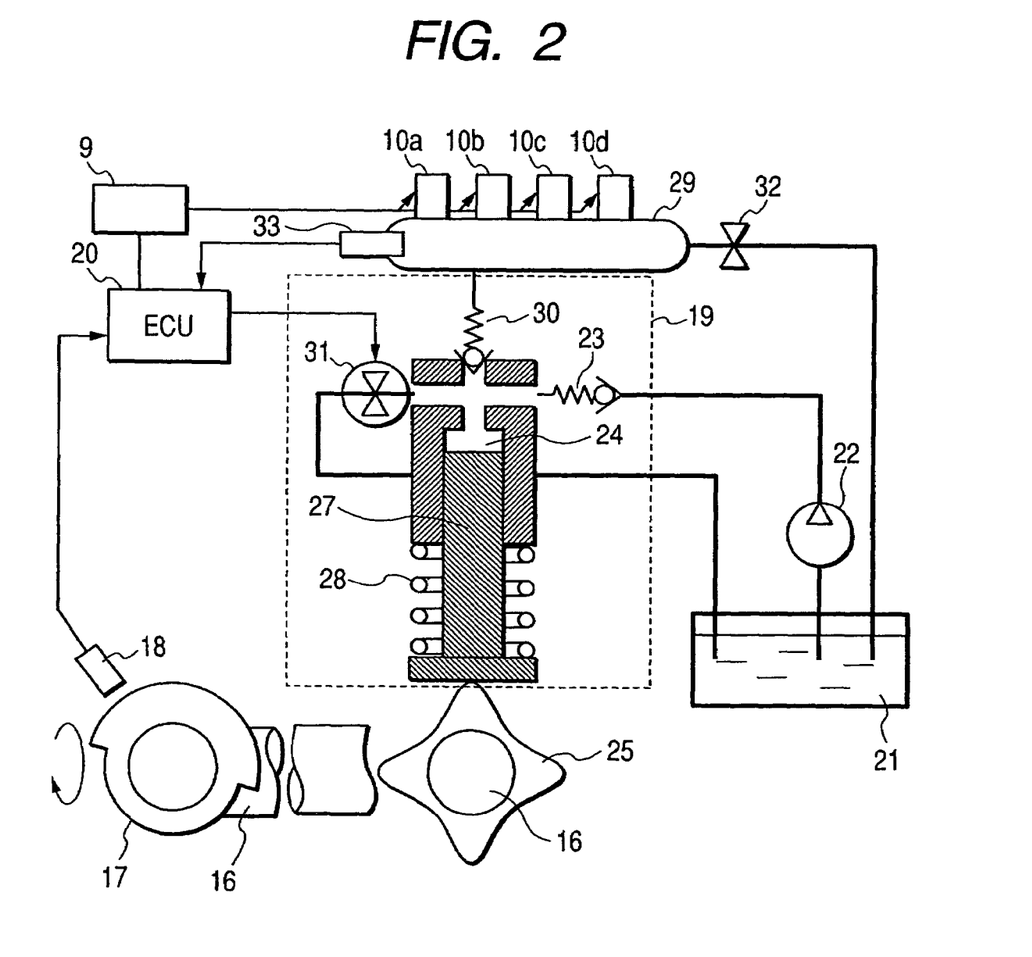
FIG. 2 is a schematic structural view for explaining a fuel supply system of the fuel supply apparatus for the internal combustion engine according to embodiment 1 of the invention.
Figure 3:
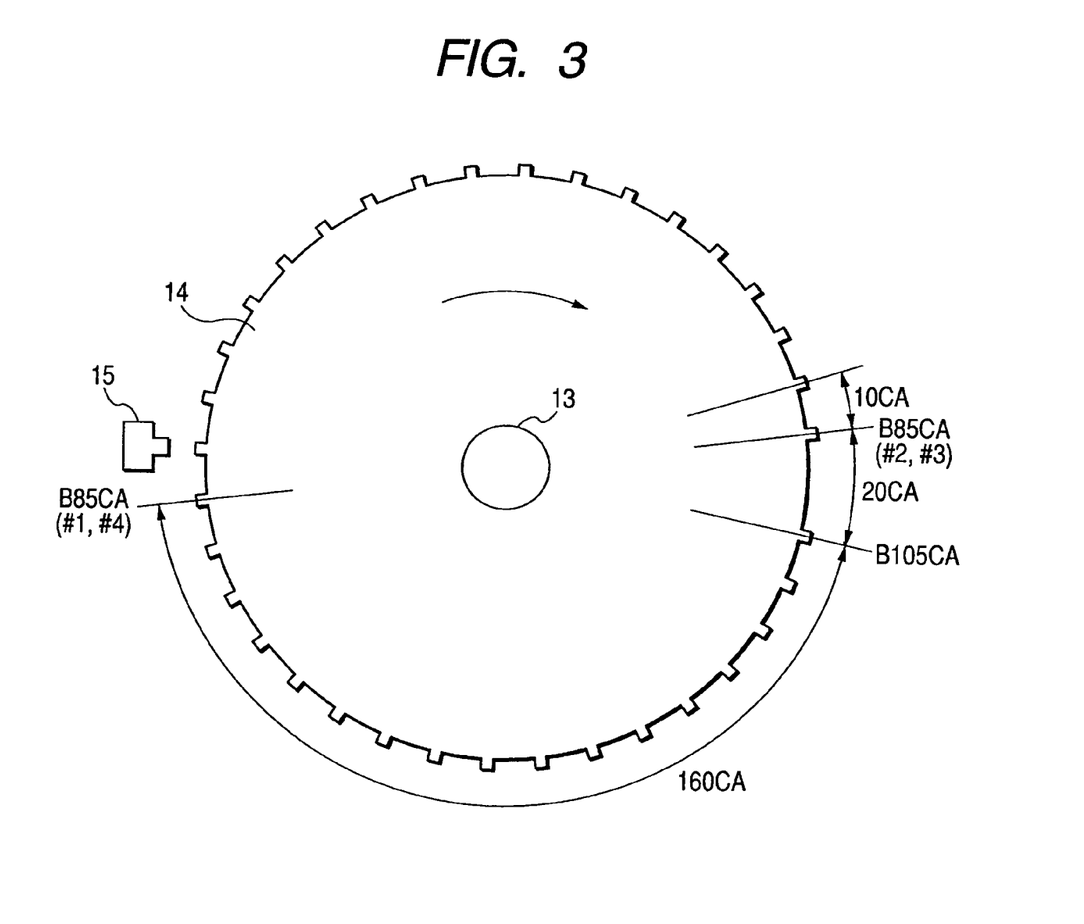
FIG. 3 is a structural view for explaining a rotation position signal detection unit of the fuel supply apparatus for the internal combustion engine according to embodiment 1 of the invention.
Figure 4:
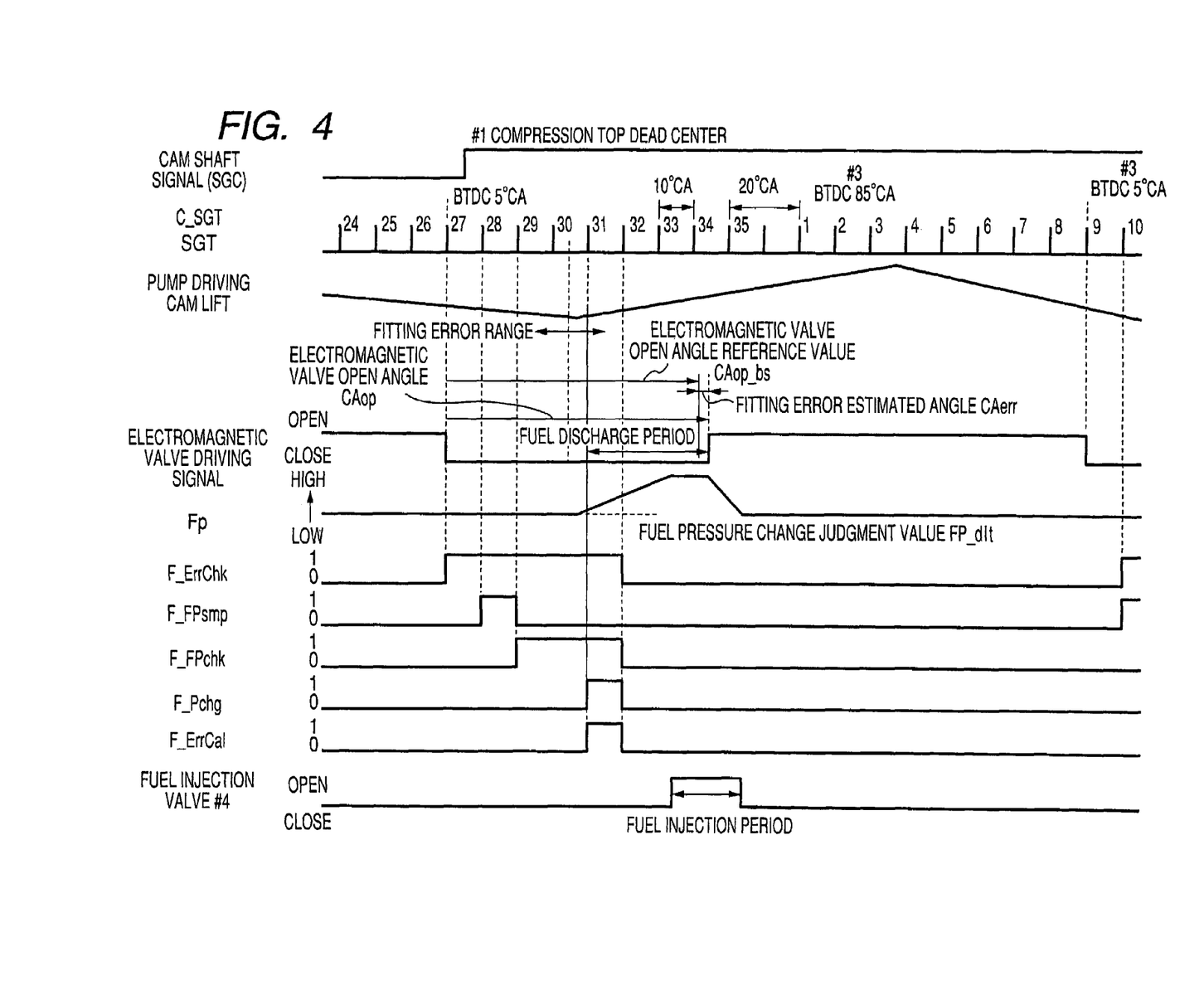
FIG. 4 is a time chart for explaining the behavior, at the time of attachment error estimation, of the fuel supply apparatus for the internal combustion engine according to embodiment 1 of the invention.
Figure 5:
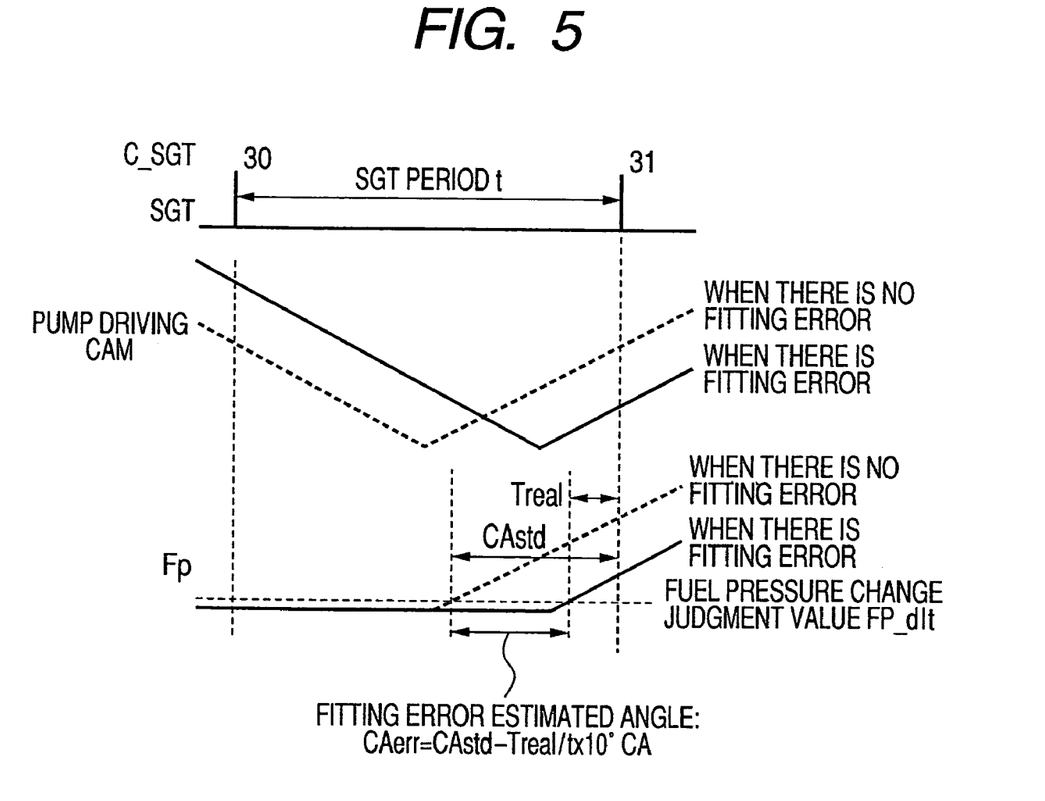
FIG. 5 is an enlarged view of the vicinity of a high pressure fuel pump discharge start time of FIG. 4.
Figure 6:
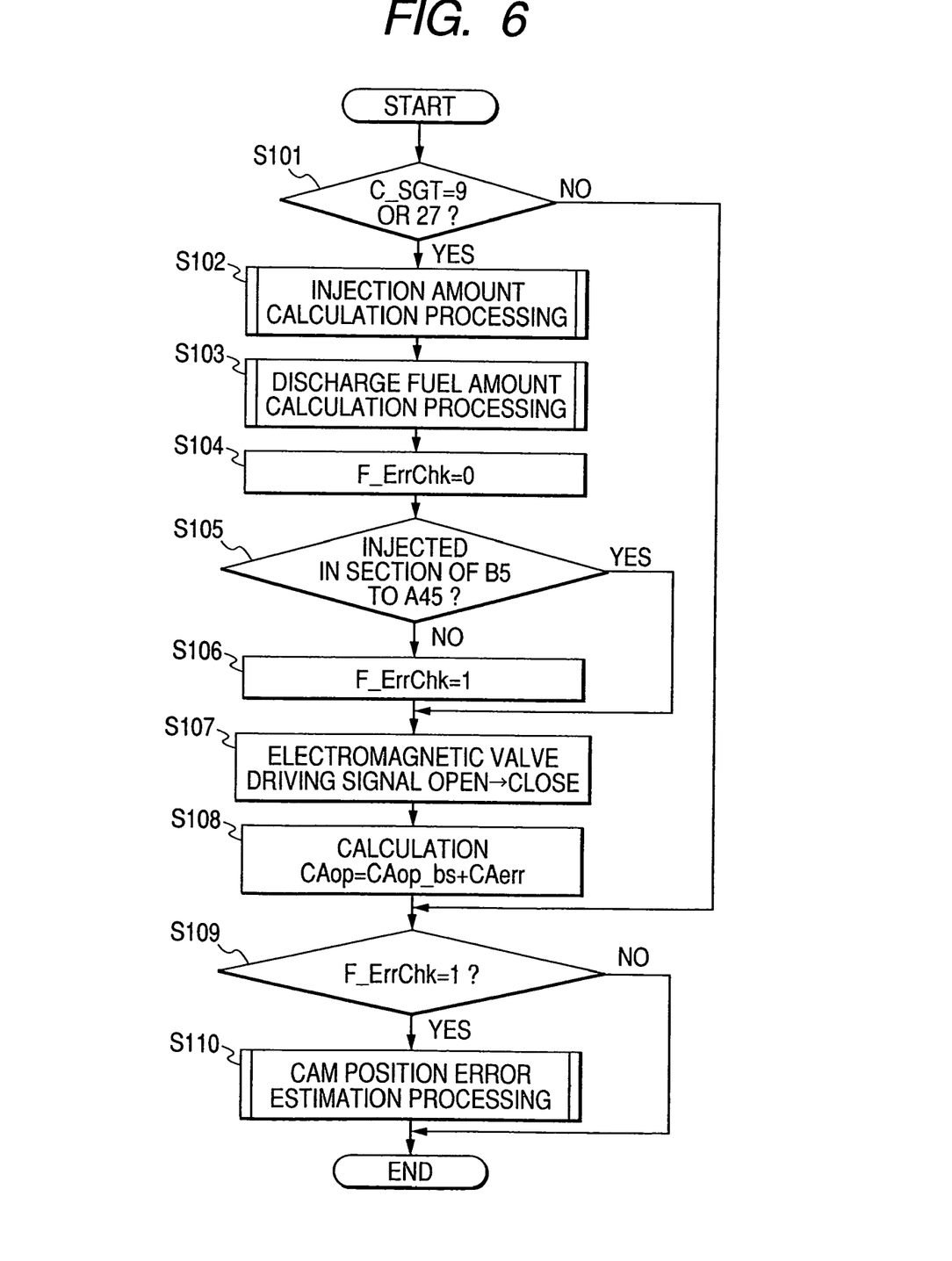
FIG. 6 is a flowchart for explaining an operation of the fuel supply apparatus for the internal combustion engine according to embodiment 1 of the invention.
Figure 7:
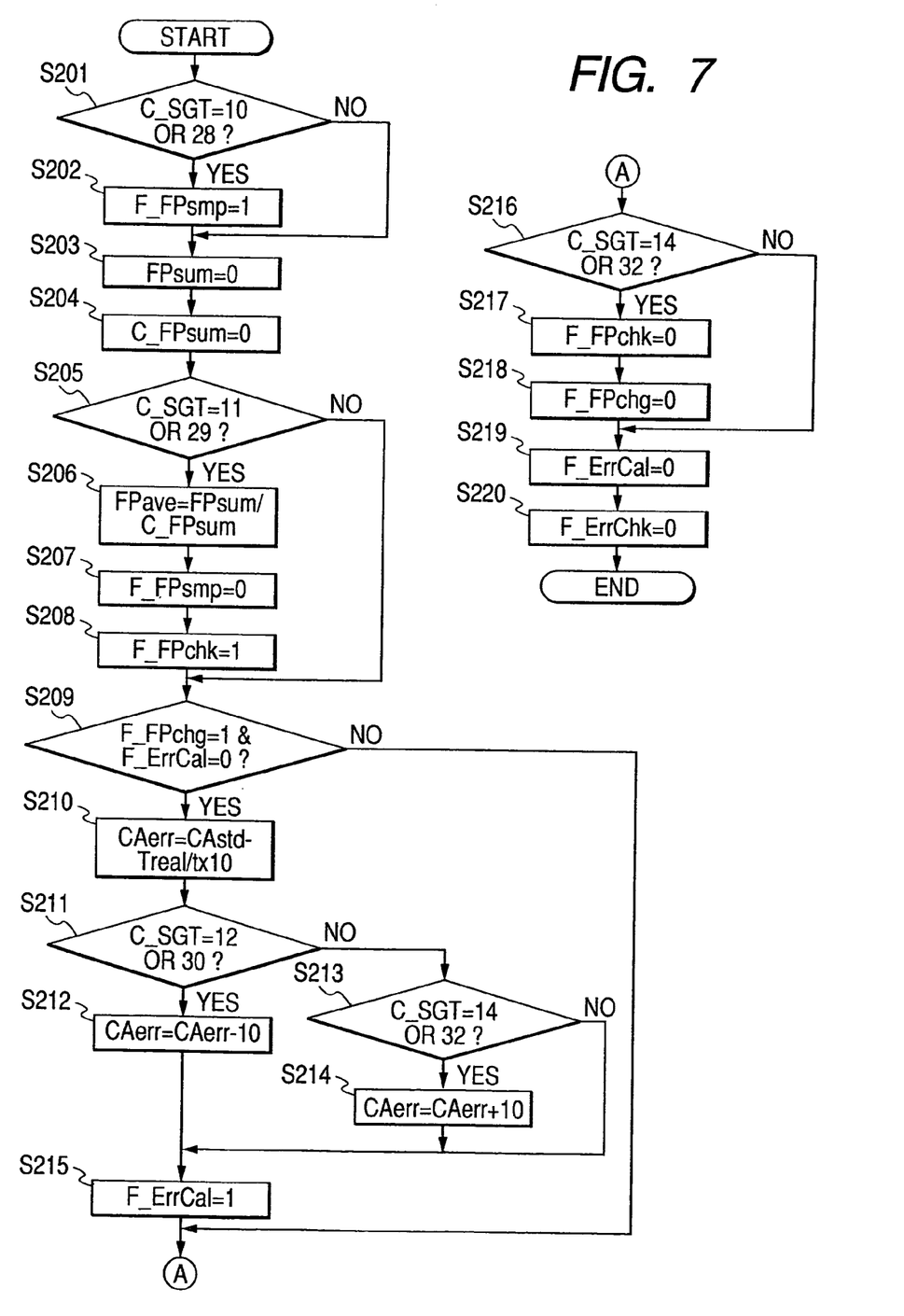
FIG. 7 is a flowchart for explaining an operation of the fuel supply apparatus for the internal combustion engine according to embodiment 1 of the invention.
Figure 8:
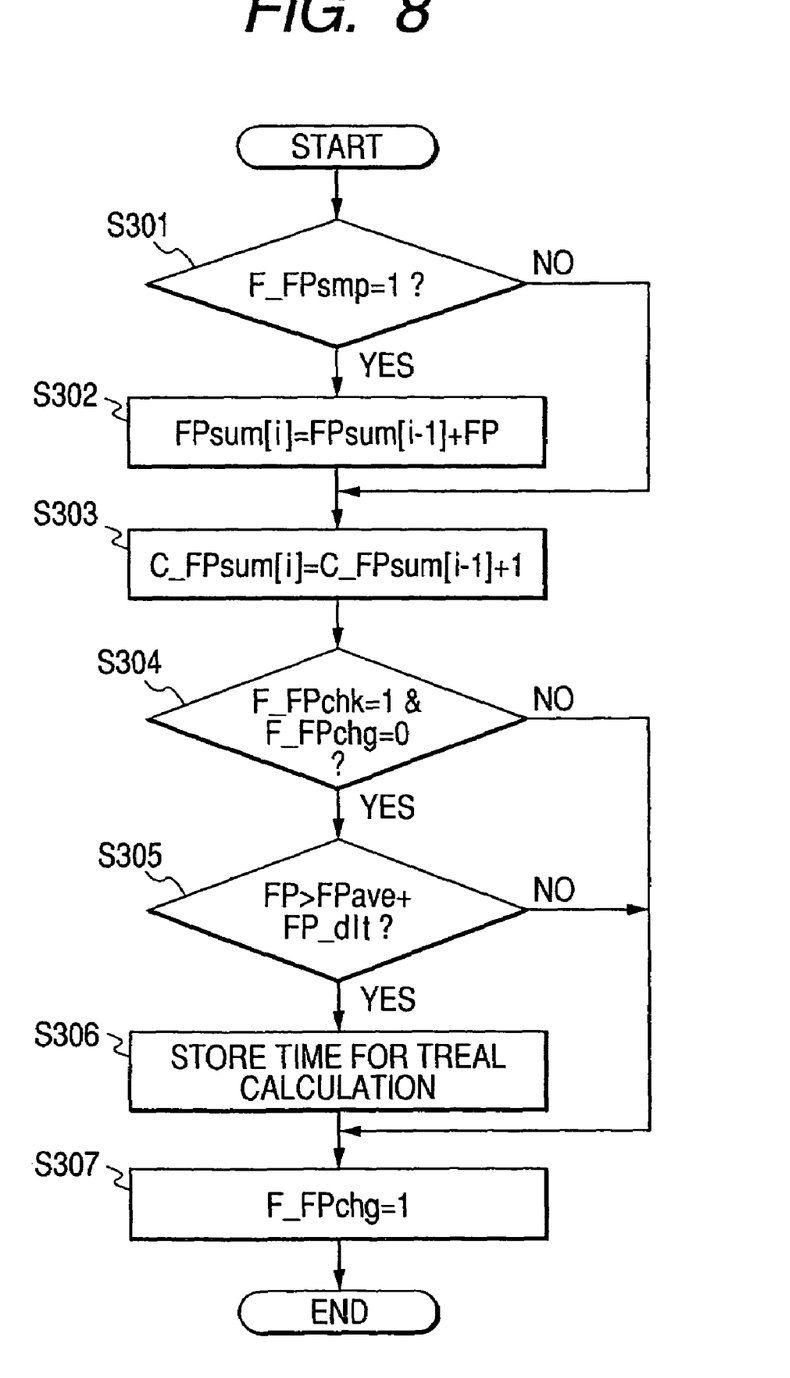
FIG. 8 is a flowchart for explaining an operation of the fuel supply apparatus for the internal combustion engine according to embodiment 1 of the invention.

FIGS. 1 to 8 are for explaining a fuel supply apparatus for an internal combustion engine according to embodiment 1 of the invention. FIG. 1 is a schematic structural view for explaining an internal combustion engine and its control system, FIG. 2 is a schematic structural view for explaining a fuel supply system, FIG. 3 is an explanatory view for explaining a structure of a rotation position signal detection unit, FIG. 4 is a time chart for explaining behavior at the time of attachment error estimation in a 4-cylinder internal combustion engine, FIG. 5 is an explanatory view for explaining the behavior of a fuel pressure in the vicinity of discharge start time of a high pressure fuel pump and error estimation, FIG. 6 is a flowchart as a basis of a cam position error estimation processing, FIG. 7 is a flowchart of the cam position error estimation processing at step S110 of FIG. 6, and FIG. 8 is a flowchart of a 1 msec processing in which sampling of fuel pressure used for the cam position error estimation processing of FIG. 7 is performed at a 1 msec period.

In FIG. 1, an intake pipe 2 for air intake into an internal combustion engine 1 is provided with an air cleaner 3 for purifying intake air, an air flow sensor 4 for measuring an intake air amount, and a throttle valve 5 for controlling the intake air amount. An exhaust pipe 6 for exhausting a combustion gas is provided with an oxygen sensor 7 for detecting oxygen concentration in the exhaust gas and a three-way catalyst 8 for purifying the exhaust gas. Besides, in the internal combustion engine 1, a fuel injection valve 10 driven by an injector driver 9 and for injecting fuel into a combustion chamber, and an ignition plug 12 for igniting a mixture gas in the combustion chamber by a voltage from an ignition coil 11 are provided for each cylinder.

A signal plate 14 as shown in FIG. 3 is attached to a crank shaft 13 of the internal combustion engine 1, and the signal plate 14 has, as shown in FIG. 3, projections at, for example, every 10° in crank angle (hereinafter referred to as 10° CA). A crank position sensor 15 for outputting a crank position signal SGT by detecting the projections is provided in the vicinity of the signal plate 14. These form a rotation position detection unit. As described above, the signal plate 14 is provided with the projections at every 10° CA, however, a position corresponding to 95° CA (hereinafter referred to as B95° CA) before a top dead center of a #2 cylinder and a #3 cylinder (that is, when one of them is before a compression top dead center, the other is before an exhaust top dead center) is a missing tooth as shown in the drawing.

The signal plate 14 is rotated in an arrow direction of the drawing, the position of the missing tooth can be detected from pulse intervals outputted by the crank position sensor 15, and the position of B85° CA as a next signal position of the missing tooth position can be specified. Further, the stroke of each cylinder and the crank position can be specified by the signal level at the B85° CA position. For example, when the signal at the B85° CA position is at the high level, the crank position can be specified as 85° before the compression top dead center of the #3 cylinder.

With reference to FIG. 1 again, an intake port of the internal combustion engine 1 is provided with a cam shaft 16, and the cam shaft 16 is driven by a mechanical coupling unit such as a timing belt to make a half rotation with respect to the crank shaft 13. A signal plate 17 is attached to the cam shaft 16, a sensor 18 is provided near the signal plate 17, and an after-mentioned SGC signal which has a high level at the top dead centers of from the first cylinder to the fourth cylinder is detected by both. The cam shaft 16 drives the intake valve and drives an after-mentioned high pressure fuel pump 19. A control unit (hereinafter referred to as ECU) 20 receives signals from the oxygen sensor 7, the crank position sensor 15, the sensor 18 and the like, and controls the injector driver 9, the ignition coil 11 and the like. In the invention, as described later, the ECU controls an electro-magnetic valve 31 to control fuel pressure in a delivery pipe 29, functions also as a cam position error estimation means for estimating an attachment position error of a pump driving cam 25, and corrects the attachment position error of the pump driving cam 25 and the high pressure fuel pump 19.

The fuel supply system of the internal combustion engine 1 is constructed as shown in FIG. 2. In FIG. 2, fuel in a fuel tank 21 is supplied to a pressure chamber 24 of the high pressure fuel pump 19 by a low pressure fuel pump 22 through a check valve 23. The high pressure fuel pump 19 includes a piston 27 driven by the pump driving cam 25 provided at the cam shaft 16 of the internal combustion engine 1 and reciprocating in a cylinder 26 to pressurize the fuel to be supplied into the pressure chamber 24, a spring 28 for always urging this piston 27 toward the pump driving cam 25 side, a check valve 30 provided at a discharge port for supplying the pressurized fuel to the delivery pipe 29, and the electromagnetic valve 31 for keeping the fuel pressure in the delivery pipe 29 at a predetermined value by returning the surplus fuel in the pressure chamber 24 to the fuel tank 21 as described later.

The delivery pipe 29 receives the pressurized fuel supply from the high pressure fuel pump 19 and holds the fuel with the predetermined pressure. Fuel injection valves 10a to 10d connected to the delivery pipe 29 and for the respective cylinders inject the fuel into respective combustion chambers of the internal combustion engine 1. The delivery pipe 29 is provided with a relief valve 32 for releasing the fuel to the fuel tank 21 when the fuel pressure is abnormally increased, and a fuel pressure sensor 33 for detecting the fuel pressure in the delivery pipe 29. The fuel injection valves 10a to 10d are controlled by the ECU 20 through the injector driver 9, and inject a necessary amount of fuel to the respective cylinders at necessary timings. The electromagnetic valve 31 is controlled by the ECU 20, the valve is closed during fuel pressurization to pressurize the fuel in the pressure chamber 24, and the valve is opened when the fuel pressure in the delivery pipe 29 detected by the fuel pressure sensor 33 reaches a predetermined value, and returns the surplus fuel to the fuel tank 21. Accordingly, when the pressure in the pressure chamber 24 comes to have a predetermined value, the check valve 30 is opened and the fuel discharge is started, and when the electromagnetic valve 31 is opened, the fuel discharge is ended.

In the fuel supply apparatus for the internal combustion engine according to this embodiment having the structure as stated above, attachment error estimation of the pump driving cam 25 and the high pressure fuel pump 19 relative to the rotation angle of the crank shaft 13 will be described with reference to FIG. 4 and the subsequent drawings as follows. First, FIG. 4 shows the behavior of respective parameters at the time of error estimation of a 4-cylinder internal combustion engine. The cam shaft signal SGC of the drawing is the signal detected by the signal plate 17 and the sensor 18, and becomes a high level signal in a range of from the top dead center of the first cylinder to the top dead center of the fourth cylinder. An SGT signal is a signal by the signal plate 14 and the crank position sensor 15 (that is, the rotation position detection unit), and is a signal as a rotation position signal of the crank shaft 13 to perform drive control of the electromagnetic valve 31.

C_SGT denotes a counter for judging the crank angle, which counts up, for example, every input of the SGT signal, and outputs 1 each time the crank angle reaches B85° CA where the missing too this detected, so that the crank position (rotation position) is obtained. In this case, C_SGT takes values of from 1 to 35. The pump driving cam lift of the drawing indicates the lift amount of the pump driving cam 25 relative to the high pressure fuel pump 19, and when the lift is rising and the electromagnetic valve 31 is closed, the fuel is discharged from the high pressure fuel pump 19 to the delivery pipe 29.

In consideration of a response delay of the electromagnetic valve 31, an electromagnetic valve driving signal is placed into a close state at B5° CA before the lift start of the pump driving cam 25, and then is placed into an open state after an electromagnetic valve open angle CAop in which CAop_bs as an electromagnetic valve open angle reference value, which becomes a timing when a required discharge amount is obtained, is corrected by an after-mentioned attachment error estimated angle CAerr. Accordingly, the electromagnetic valve open angle CAop is calculated as CAop=CAop_bs±CAerr. Although the fuel injection valves 10a to 10d perform injection of fuel at intake strokes of the respective cylinders, in the range shown in FIG. 4, only the #4 cylinder performs the fuel injection, and accordingly, those other than the #4 cylinder are omitted.

A fuel pressure Fp indicates the fuel pressure in the delivery pipe 29 measured by the fuel pressure sensor 33. When the fuel is discharged from the high pressure fuel pump 19, the value of Fp is increased, and when the fuel is injected from one of the fuel injection valves 10a to 10d, the value of Fp is decreased. F_ErrChk in the drawing denotes a section in which estimation of the attachment error is performed. When the fuel injection valves 10a to 10d do not perform the fuel injection in the section of from B5° CA of each cylinder to A45° CA (crank angle of 45° after the top dead center) (section in which C_SGT is from 27 to 32 or from 9 to 14), F_ErrChk is set to 1 as the error estimation section.

E_FPsmp indicates a reference fuel pressure section inside, and is set to 1 in a section in which the fuel is not discharged irrespective of the attachment error of the pump driving cam 25 in the error estimation section. In this embodiment, it is a section of from 5° CA after the compression top dead center of each cylinder to 15° CA (that is, a section in which C_SGT is from 28 to 29 or from 10 to 11), and an average value of Fp sampled therebetween is made a reference fuel pressure FPave).

F_FPchk denotes a fuel pressure change detection section, and is set to 1 in the error estimation section, in the vicinity of the lift start of the pump driving cam 25, in a range where the attachment error can be taken, and in a section where detection of a fuel pressure change becomes possible. In this embodiment, the lift start is made 30° CA after the compression top dead center of each cylinder, and when an attachment error is made ±10° CA to produce a tolerance, the section becomes the range of from 15° CA after the compression top dead center of each cylinder to 45° CA (C_SGT is from 29 to 32 or from 11 to 14), and the change position of the fuel pressure is detected only therebetween.

F_FPchg is set to 1 when the change of the fuel pressure is detected, and the time at this time point is stored. By this, at a next SGT time point, an after-mentioned fuel pressure change position Treal and an attachment error estimated angle CAerr are calculated. F_ErrCal denotes a flag indicating that the calculation of the attachment error estimated angle CAerr is completed, and is set to 1 at the time point when this calculation of the attachment error estimated angle CAerr is completed in the SGT synchronization processing in which F_FPchg=1 is detected.

FIG. 5 is an enlarged view of a vicinity of a range in which C_SGT is from 30 to 31 in FIG. 4, and shows a change of the fuel pressure generated at the time of discharge start of the high pressure fuel pump. 19 and an estimation method of an error at that position. A broken line in the drawing indicates behavior in the case where the attachment error does not exist. In the estimation method of the error, first, a change position of the fuel pressure relative to SGT in the case where the attachment error does not exist is previously stored as the reference fuel pressure change position CAstd, and the actual fuel pressure change position Treal is detected, so that the attachment error estimated angle CAerr is calculated using the SGT period t as follows.

$$CAerr = CAstd - Treal/t \times 10° \ CA \quad (1)$$

In this calculation expression, since CAstd is made the reference, it becomes possible to cancel the influence of a delay from the lift start of the pump driving cam 25 to the fuel pressure change due to the discharge start.

The above expression (1) is for the case where Treal is at the retard angle side of CAstd and C_SGT is from 30 to 31. However, Treal can exist at the advance angle side naturally, and in that case, CAerr comes to have a minus value. In the case where Treal and CAstd are positioned at both sides of C_SGT, for example, even in the case where Treal is detected when C_SGT is 31 or later, the SGT interval is 10 or 20° CA, and therefore, the amount has only to be considered.

Subsequently, the content of a processing performed in synchronization with SGT by the ECU 20 will be described with reference to FIG. 6, the processing content of the cam position error estimation processing performed in synchronization with SGT in FIG. 6 will be described with reference to FIG. 7, and the sampling processing of the fuel pressure performed at intervals of 1 msec will be described with reference to FIG. 8. First, the processing of FIG. 6 will be described. At step S101, it is judged whether C_SGT is 9 or 27, and when C_SGT is 9 or 27, the procedure proceeds to step S102, and if not, the procedure proceeds to step S109.

When C_SGT is 9 or 27 at step S101 and the procedure proceeds to step S102, the fuel injection amount and injection timing are calculated on the basis of the operation state of the internal combustion engine 1. At subsequent step S103, on the basis of the operation state of the internal combustion engine 1, the target fuel pressure is calculated, and a request discharge fuel amount to the high pressure fuel pump 19 is calculated from the fuel pressure Fp and the fuel injection amount. At step S104, F_ErrChk is once set to 0, and at step S105, it is judged whether the fuel injection valves 10*a* to 10*d* perform fuel injection in a section of from B5° CA of each cylinder to A45° CA, that is, in a section where C_SGT is from 27 to 32 or from 9 to 14.

When the fuel injection is not performed at step S105, the procedure proceeds to step S106, and F_ErrChk is set to 1 as the error estimation section. When the fuel injection is performed at step S105, the procedure proceed to step S107. Accordingly, in the case where the procedure proceeds to step S107, F_ErrChk keeps 0 set at step S104, and the after-mentioned cam position error estimation processing is not performed. At step S107, the driving signal to open/close the electromagnetic valve 31 is changed from the open state to the close state, and when the piston 27 is raised by this, the fuel can be discharged from the fuel pump 19.

At subsequent step S108, an electromagnetic valve open angle reference value CAop_bs at which the required fuel discharge amount calculated at step S103 is obtained, and the attachment error estimated angle CAerr estimated in the past is added to this to calculate an electromagnetic valve open angle CAop. In the case where CAerr is not calculated in the past, CAerr is made 0. After CAop has passed, the electromagnetic valve 31 is opened and the discharge of the fuel is ended. At step S109, it is judged whether F_ErrChk is 1, and when F_ErrChk is 1, the cam position error estimation processing is performed at step S110, and when F_ErrChk is 0, the procedure is ended and the processing is repeated.

Subsequently, the cam position error estimation processing at step S110 will be described with reference to FIG. 7. First, at step S201, according to whether the value of C_SGT is 10 or 28, it is judged whether the position is the sample start position of the reference fuel pressure FPave when the fuel pressure change position is detected. In the case where it is the sample start position, the procedure proceeds to step S202, F_FPsmp is set to 1 as the reference fuel pressure section, and the after-mentioned 1 msec processing is allowed. At subsequent steps S203 and S204, variables FPsum and C_FPsum for the fuel pressure sampling are initialized to 0.

On the other hand, in the case where step S201 does not indicate the sampling start position, the procedure proceeds to step S205, and the processing from step S202 to S204 is not performed. At step S205, it is judged whether C_SGT is 11 or 29, and in the case where C_SGT is not 11 or 29, the procedure directly proceeds to step S209. When C_SGT is 11 or 29, the procedure proceeds to step S206, and the reference fuel pressure FPave is calculated from the sampling result at the after-mentioned 1 msec processing as $$FPave = FPsum/C\_FPsum. \qquad (2)$$

At C_SGT of step S205, the reference fuel pressure section is completed, so that F_FPsmp is set to 0 at step S207.

Further, the procedure proceeds to step S208, F_FPchk is set to 1 as the fuel pressure change detection section, and the detection of the fuel pressure change at the after-mentioned 1 msect processing is allowed. At subsequent step S209, it is judged whether F_FPchk is 1 and F_ErrCal is 0. When this condition is established, the detection of the fuel pressure change position is performed at the after-mentioned 1 msec processing, and since the calculation of the attachment error estimated angle CAerr is not completed, steps subsequent to step S210 are performed, and the attachment error estimated angle is calculated.

At step S210, on the assumption that C_SGT is 13 or 30, the attachment error estimated angle CAerr is calculated from the above expression (1). Treal of this calculation is obtained by subtracting time at the fuel pressure change position stored by the after-mentioned 1 msec processing from the present time, and CAerr is calculated from this SGT period t and the reference fuel pressure change position CAstd in the case where the attachment error does not exist. At subsequent step S211, it is judged whether C_SGT is 12 or 30, and when C_SGT is 12 or 30, the actual fuel pressure change position is a position where an advance of 10° CA is made. Thus, at step S212, a value obtained by subtracting 10° CA from CAerr obtained at step S210 is made CAerr.

In the case where C_SGT is not 12 or 30 at step S211, the procedure proceeds to step S213, and it is judged whether C_SGT is 14 or 32. In the case where this judgment is yes, since the actual fuel pressure change position is the position where a retard of 10° CA is made, at step S214, a value obtained by adding 10° CA to CAerr obtained at step S210 is made CAerr. When both steps S211 and S213 are not established, since the attachment error estimated angle CAerr is calculated at step S210 on the assumption that C_SGT is 13 or 30, the value of CAerr becomes the value calculated at step S210.

At step S215, the flag indicating that calculation of the attachment error estimated angle CAerr is completed is set to 1. At subsequent step S216, it is judged whether C_SGT is 14 or 32, and it is judged whether the error estimation section is ended. If ended, F_FPchk is made 0 at step S217, F_FPchg is made 0 at step S218, and F_ErrCal is made 0 at step S219 to initialize the respective flags used for the error estimation. At step S220, F_ErrChk is set to 0, and the cam position error estimation processing is ended.

In the processing described above, at the time of the end of the error estimation section, the existence of the fuel pressure change detection is not judged. However, since failures of the fuel pump 19 and the fuel pressure sensor 33 can be detected by performing the judgment of the fuel pressure change, this judgment can be added.

Subsequently, the sampling of the fuel pressure allowed at step S202 and the 1 msec processing for detection of the fuel pressure change allowed at step S208 will be described with reference to. FIG. 8. First, at step S301, it is judged whether F_FPsmp is 1. In the case where F_FPsmp is 1, since the fuel pressure sampling for reference fuel pressure is allowed as the reference fuel pressure section, the procedure proceeds to step S302 and the fuel pressure is summed up to FPsum, and at step S303, a summation count C_FPsum is increased by 1. At step S304, it is judged whether F_FPchk is 1 and F_FPchg is 0, and when the judgment is yes, since the detection of the fuel pressure change is allowed as the fuel pressure change detection section, and the fuel pressure change has not been detected, the change of the fuel pressure is judged at step S305.

At step S305, it is judged whether the fuel pressure FP is larger than a value obtained by adding the fuel pressure change judgment value FP_dlt to the reference fuel pressure FPave calculated at step S206, and in the case where FP is larger than FPave+FP_dlt, it is judged that the fuel pressure change is detected, and steps S306 and S307 are performed. The fuel pressure change judgment value FP_dlt is set so that erroneous detection due to pulsation of the fuel pressure or the like is not performed, and for example, about 0.1 MPa is suitable. At step S306, the present time is stored for Treal calculation, and at step S307, the flag F_FPchg indicating that the fuel pressure change is detected is set to 1 and the routine is ended. The present time for Treal calculation stored at step S306 is used for step S210.

As stated above, on the basis of the fuel pressure change position occurring at the time of the discharge start of the fuel pump 19, the attachment error of the fuel pump 19 and the pump driving cam 25 relative to the rotation signal is estimated, and the driving signal of the electromagnetic valve 31 is corrected. Thus, it becomes possible to control the electromagnetic valve 31 with high accuracy.

As the behavior of the respective parameters, in the example shown in FIG. 4, as a result of the injection amount calculation processing, since the fuel injection valve 10a of the #1 cylinder does not perform the fuel injection in the section of from B5° CA to A45° CA (C_SGT is from 27 to 32), at B5° CA of the #1 cylinder (C_SGT is 27), F_ErrChk is set to 1 as the error estimation section (step S106),the electromagnetic valve driving signal is changed from the open state to the close state (step s107), and the electromagnetic valve open angle CAop is calculated at step S108.

Since F_ErrChk is set to 1, the cam position error estimation processing is performed at step S110. In the section where C_SGT is from 28 to 29, as the reference fuel pressure section, F_FPsmp is set to 1, and the reference fuel pressure FPave is calculated. Besides, when C_SGT is 29, the section is the fuel pressure change detection section and F_FPchk is set to 1. When C_SGT is between 30 and 31, in the 1 msec processing, the fuel pressure FP exceeds a value obtained by adding the fuel pressure change judgment value FP_dlt to the reference fuel pressure FPave, so that F_FPchg is set to 1.

Further, it is detected that C_SGT is 31 and F_FPchg is set to 1, and the attachment error estimated angle CAerr is calculated, and F_ErrCal is set to 1. When C_SGT is 32, the flags F_FPchk, F_FPchg, and F_ErrCal used for the error estimation are initialized to 0, F_ErrChk is set to 0, and the cam position error estimation processing is ended.

In the above operation, the position where the value of C_SGT is 10 or from 28 to 11 or 29 is made the sample position of the reference fuel pressure, and F_FPsmp is set to 1. This section is the section in which fuel discharge from the high pressure fuel pump 19 does not occur irrespective of the existence of the attachment error. The fuel pressure in this section is made the reference fuel pressure, and the rotation position where the fuel pressure is raised by a predetermined value relative to this value is made the fuel pressure change position. Thus, in accordance with the state where the error estimation is performed, the fuel pressure as the reference is obtained just before the error estimation, and the fuel pressure change position can be obtained with high accuracy. In the reference fuel pressure section and the fuel pressure change detection section, the fuel injection valve 10 is not driven, the error estimation becomes possible only in a necessary section, the load of the processing is reduced, and it becomes possible to avoid the influence of the change of the fuel pressure due to the operation of the fuel injection valve 10.

Further, the reference fuel pressure change position is previously stored as the change position of the fuel pressure when the attachment error does not exist, and this position is compared with the fuel pressure change position, so that the error is estimated. Thus, it is not necessary to provide such a processing as to estimate a period from the rise of the lift of the pump driving cam 25 to the rise of the fuel pressure, and the correction of the attachment error can be easily performed. Besides, the pump driving cam 25 is provided at the cam shaft 16 of the internal combustion engine 1, and the rotation position signal is obtained from the crank shaft 13. Thus, the signal plate 14 used for the rotation signal can be made large to increase the number of pulses, and the electromagnetic valve 31 can be driven with high accuracy.

Embodiment 2

Figure 9:
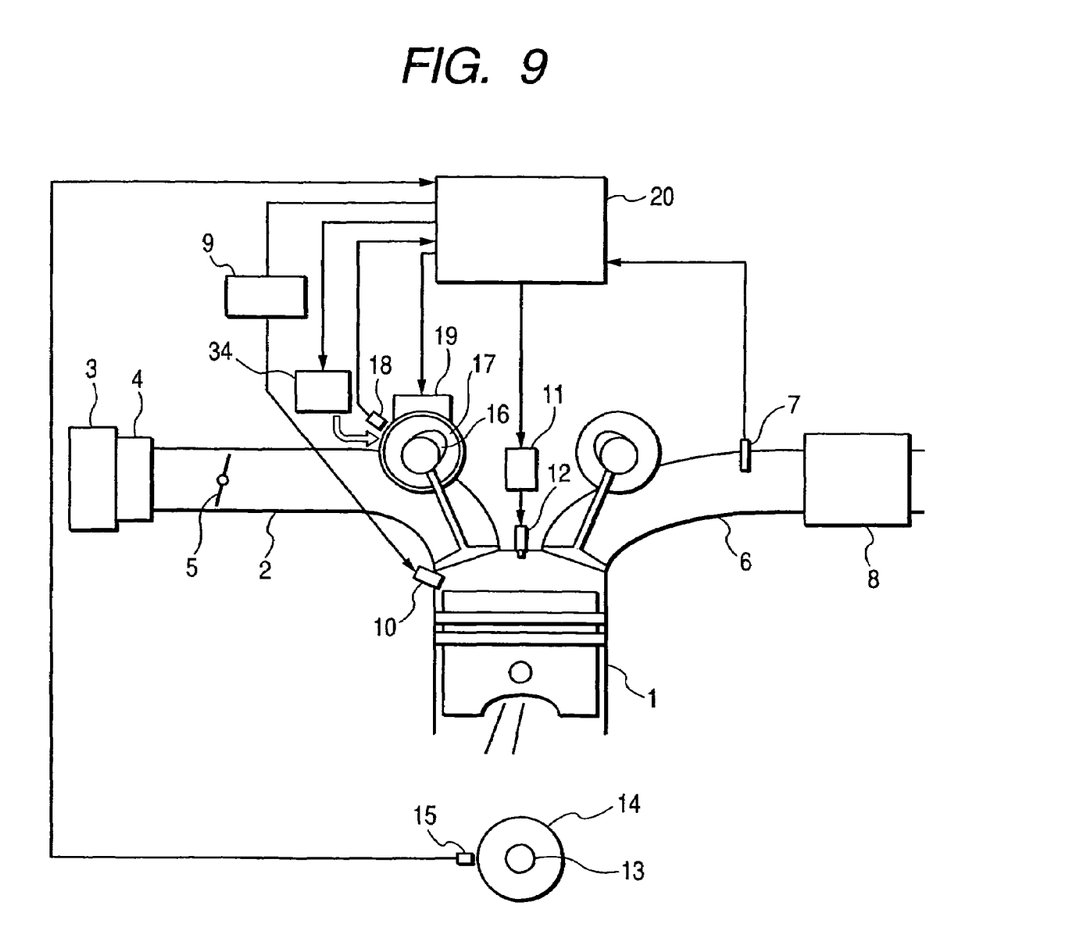
FIG. 9 is a schematic structural view for explaining a fuel supply apparatus for an internal combustion engine according to embodiment 2 of the invention.

FIG. 9 is a schematic structural view for explaining a fuel supply apparatus for an internal combustion engine according to embodiment 2 of the invention. In this embodiment, an internal combustion engine provided with a variable valve timing mechanism is made to have a cam position error correction function of the invention. In the schematic structural view of FIG. 9, as compared with the schematic structural view of FIG. 1, a variable timing mechanism 34 is added to a cam shaft 16. In an internal combustion engine 1 having the structure as stated above, the phase of the cam shaft 16 with respect to a crank shaft 13 is changed. However, the cam position error estimation of FIGS. 6 to 8 described in the embodiment 1 is performed only in a period in which the variable valve timing mechanism 34 does not operate, so that it becomes possible to perform an operation similar to the case of embodiment 1.

Embodiment 3

Figure 10:
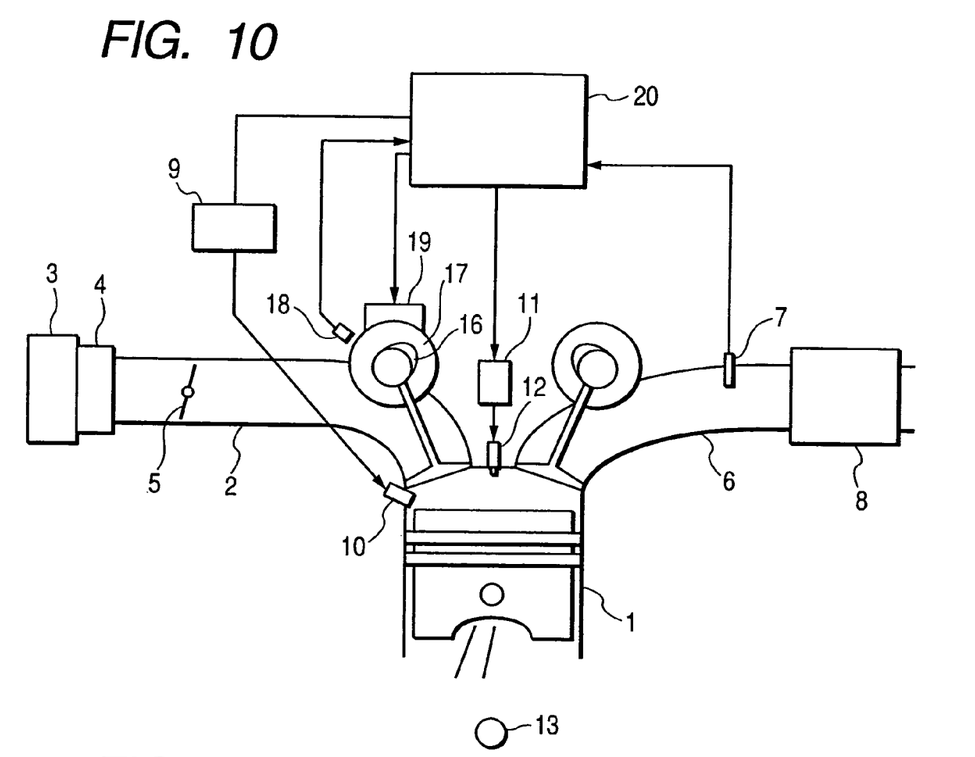
FIG. 10 is a schematic structural view for explaining a fuel supply apparatus for an internal combustion engine according to embodiment 3 of the invention.

FIG. 10 is a schematic structural view for explaining a fuel supply apparatus for an internal combustion engine according to embodiment 3 of the invention. In the fuel supply apparatus for the internal combustion engine of this embodiment, as compared with the schematic structural view of embodiment 1 shown in FIG. 1, the signal plate 14 and the position sensor 15 provided at the crank shaft 13 are removed. The SGT signal (see FIG. 4) obtained by the signal plate 14 and the position sensor 15 is obtained by a signal plate 17 provided at a cam shaft 16 and for obtaining a cam shaft signal and a sensor 18. Even when the structure as stated above is adopted, it becomes possible to perform the same operation as the case of embodiment 1, and it becomes possible to remove an error due to a timing belt for driving the cam shaft 16 from the crank shaft 13, or the like.

Embodiment 4

Figure 11:
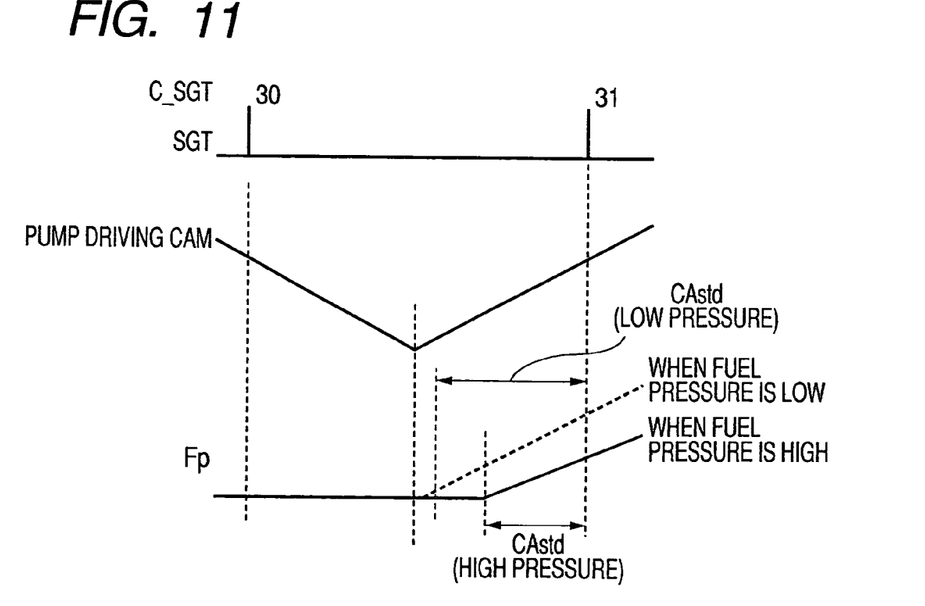
FIG. 11 is a time chart for explaining a fuel supply apparatus for an internal combustion engine according to embodiment 4 of the invention.

FIG. 11 is a time chart for explaining a fuel supply apparatus for an internal combustion engine according to embodiment 4 of the invention, and as compared with the case of embodiment 1, setting of a reference fuel pressure change position is changed. In embodiment 1, the reference fuel pressure change position CAstd is made the position where the attachment error does not exist. In this embodiment, the reference fuel pressure change position CAstd is set according to a fuel pressure (for example, FPave) at that time point.

As shown in FIG. 11, a time from a lift start point of a pump driving cam 25 to a change of fuel pressure in a delivery pipe 29 becomes large as the fuel pressure in the delivery pipe 29 becomes high. Accordingly, the reference fuel pressure change position CAstd is changed correspondingly to, for example, a reference fuel pressure FPave, so that it becomes possible to remove the influence due to the change of the fuel pressure. Similarly, it is also possible to correct an actual fuel pressure change position Treal and an attachment error estimated angle CAerr by the fuel pressure at that time point.

Embodiment 5

In a fuel supply apparatus for an internal combustion engine according to embodiment 5, estimation of a cam position error is performed at the time of low speed rotation of the internal combustion engine. For example, in the 1 msec processing shown in FIG. 8 of embodiment 1, sampling of the fuel pressure is performed at a 1 msec period. However, in the case where the rotation speed of the internal combustion engine becomes high, the rotation angle between the sampling periods also becomes large, and the detection accuracy becomes low. For example, in the case where the rotation speed of the internal combustion engine is 3000 rpm, the period of 1 msec becomes 18° CA. Thus, in the case where the attachment error estimation is performed at this sampling period, it becomes impossible to perform the estimation with high accuracy.

On the other hand, for example, in the case of 300 rpm, the period of 1 msec is 1.8° CA in rotation angle, and the correction is performed with high accuracy. The accuracy of the cam position error estimation becomes high when the rotation speed is not higher than idling rotation and becomes low. Besides, it is necessary that the fuel injection valve 10 is not driven in the error estimation section, and when the error estimation is performed at a starting time before the fuel injection valve 10 is driven, the estimation can be performed with higher accuracy. Further, as shown in FIG. 11, the period from the start of the rise of the lift of the pump drive cam 25 to the rise of the fuel pressure in the delivery pipe 29 becomes long as the fuel pressure rises, and the fluctuation also increases. Thus, when the error estimation is performed at the starting time when the fuel pressure is sufficiently low, the accuracy becomes high. As stated above, when the error estimation is performed at the time of low speed rotation such as the starting time, it becomes possible to reduce the influence of the sample period, fuel injection and fuel pressure.

Although the description of the respective embodiments has been made with respect to the 4-cycle internal combustion engine, the number of cylinders is not limited to four. In FIG. 2, although the pump driving cam 25 has also four projections the number of which is equal to the number of the cylinders, the number is not limited to this. Besides, in the description, although the attachment error estimated angle CAerr is calculated at each time, the attachment error is not abruptly changed, and may be stored even after the stop of the internal combustion engine. Besides, an averaging processing can also be performed.

The fuel supply apparatus for the internal combustion engine of the invention can be applied to a direct-injection internal combustion engine in which pressurized fuel in a delivery pipe is directly injected into a combustion chamber of the internal combustion engine.

What is claimed is:

1. A fuel supply apparatus for an internal combustion engine, comprising:
   a delivery pipe for supplying a pressurized fuel to a fuel injection valve for performing fuel supply to each cylinder of the internal combustion engine;
   a high pressure fuel pump actuated by a pump driving cam driven by the internal combustion engine and for discharging the pressurized fuel to the delivery pipe;
   an electromagnetic valve for adjusting a fuel discharge amount from the high pressure fuel pump;
   a rotation position detection unit for outputting a rotation position signal of the internal combustion engine;
   a control unit for controlling the electromagnetic valve by a control signal corresponding to the rotation position signal so that the fuel discharge amount corresponds to an operation state of the internal combustion engine, and for controlling a fuel pressure in the delivery pipe; and
   a cam position error estimation means for estimating an attachment error of the high pressure fuel pump and the pump driving cam on the basis of a fuel pressure change position where the fuel pressure in the delivery pipe is changed by a start of fuel discharge from the high pressure fuel pump and a rotation position of the internal combustion engine obtained by the rotation position detection unit,
   wherein the control unit controls the control signal to the electromagnetic valve according to the attachment error estimated by the cam position error estimation means.

2. A fuel supply apparatus for an internal combustion engine according to claim 1, wherein the cam position error estimation means makes a section in which fuel discharge from the high pressure fuel pump does not occur irrespective of existence of the attachment error a reference fuel pressure section, and makes a rotation position where the fuel pressure in the delivery pipe rises by a predetermined value with respect to the reference fuel pressure in the reference fuel pressure section the fuel pressure change position.

3. A fuel supply apparatus for an internal combustion engine according to claim 1, wherein the cam position error estimation means makes a range, which is in a vicinity of a fuel discharge start position of the high pressure fuel pump and in which the attachment error of the high pressure fuel pump and the pump driving cam can be taken, a fuel pressure change position section, and the attachment error is estimated in the fuel pressure change position section and the reference fuel pressure section, and in a section where the fuel injection valve does not inject the fuel.

4. A fuel supply apparatus for an internal combustion engine according to claim 1, wherein the cam position error estimation means stores, as a reference fuel pressure change position, the fuel pressure change position at a time when the attachment error does not exist, and estimates the attachment error from the reference fuel pressure change position and the fuel pressure change position where the fuel pressure is actually changed.

5. A fuel supply apparatus for an internal combustion engine according to claim 1, wherein the pump driving cam is provided at a cam shaft of the internal combustion engine, and the rotation position signal by the rotation position detection unit is outputted in synchronization with rotation of a crank shaft of the internal combustion engine.

6. A fuel supply apparatus for an internal combustion engine according to claim 1, wherein the pump driving cam is provided at a cam shaft of the internal combustion engine, and the rotation position signal is outputted in synchronization with rotation of the cam shaft of the internal combustion engine.

7. A fuel supply apparatus for an internal combustion engine according to claim 1, wherein the internal combustion engine includes a variable valve timing mechanism, the pump driving cam is provided at a cam shaft constructed so that valve timing is variable, and the estimation of the attachment error is performed by the cam position error estimation means during a period when the variable valve timing mechanism does not operate.

8. A fuel supply apparatus for an internal combustion engine according to claim 4, wherein the cam position error estimation means corrects at least one of the fuel pressure change position and the reference fuel pressure change position by the fuel pressure in the delivery pipe.

9. A fuel supply apparatus for an internal combustion engine according to claim 1, wherein the cam position error estimation means performs the estimation of the attachment error in a low rotation range not higher than idle rotation of the internal combustion engine.

10. A fuel supply apparatus for an internal combustion engine according to claim 9, wherein the low rotation range of the internal combustion engine in which the estimation of the attachment error is performed is a starting time before the fuel injection valve operates.

11. A fuel supply apparatus for an internal combustion engine according to claim 9, wherein the low rotation range of the internal combustion engine in which the estimation of the attachment error is performed is a starting time when the fuel pressure in the delivery pipe is low.

* * * * *